(12) United States Patent
Hughes et al.

(10) Patent No.: US 10,087,844 B2
(45) Date of Patent: Oct. 2, 2018

(54) BUNDLED TUBE FUEL NOZZLE ASSEMBLY WITH LIQUID FUEL CAPABILITY

(71) Applicant: General Electric Company, Schenectady, NY (US)

(72) Inventors: Michael John Hughes, Pittsburgh, PA (US); Stanley Kevin Widener, Greenville, SC (US); Jonathan Dwight Berry, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 345 days.

(21) Appl. No.: 14/944,298

(22) Filed: Nov. 18, 2015

(65) Prior Publication Data

US 2017/0138267 A1 May 18, 2017

(51) Int. Cl.
| | |
|---|---|
| *F02C 7/22* | (2006.01) |
| *F23R 3/04* | (2006.01) |
| *F23R 3/14* | (2006.01) |
| *F23D 14/64* | (2006.01) |
| *F23R 3/12* | (2006.01) |

(Continued)

(52) U.S. Cl.
CPC ............... *F02C 7/222* (2013.01); *F02C 7/22* (2013.01); *F23D 14/62* (2013.01); *F23D 14/64* (2013.01); *F23R 3/04* (2013.01); *F23R 3/045* (2013.01); *F23R 3/10* (2013.01); *F23R 3/12* (2013.01); *F23R 3/14* (2013.01); *F23R 3/28* (2013.01); *F23R 3/286* (2013.01); *F23R 3/32* (2013.01); *F23R 3/36* (2013.01); *F05D 2220/32* (2013.01); *F05D 2240/35* (2013.01)

(58) Field of Classification Search
CPC ........ F02C 7/22; F02C 7/222; F05D 2240/35; F23D 14/62; F23D 14/64; F23R 3/04; F23R 3/045; F23R 3/10; F23R 3/12; F23R 3/14; F23R 3/28; F23R 3/286; F23R 3/30; F23R 3/32; F23R 3/36; F23R 3/42; F23R 3/46
See application file for complete search history.

(56) References Cited

U.S. PATENT DOCUMENTS

| | | | | |
|---|---|---|---|---|
| 9,518,742 | B2 * | 12/2016 | York | F23R 3/286 |
| 2006/0156730 | A1 * | 7/2006 | Dinu | F23D 23/00 |
| | | | | 60/723 |

(Continued)

OTHER PUBLICATIONS

Extended European Search Report and Opinion issued in connection with corresponding EP Application No. 16198936.3 dated Mar. 17, 2017.

*Primary Examiner* — Scott Walthour
(74) *Attorney, Agent, or Firm* — Dority & Manning, P.A.

(57) ABSTRACT

A bundled tube fuel nozzle assembly includes a fuel injector and a tube bundle comprising a plurality of tubes that provide for fluid communication through a forward plate, a fuel plenum and an aft plate of the bundled tube fuel nozzle assembly. Each tube includes an inlet defined at an upstream end of the tube and an outlet defined at a downstream end of the tube. The fuel injector is disposed upstream from the inlets of each of the tubes. The upstream end of each tube is noncircular and includes at least one side portion that abuts a complementary upstream end side portion of an immediately adjacent tube of the plurality of tubes. The downstream end of each tube may be circular and is spaced apart from the downstream ends of immediately adjacent tubes of the plurality of tubes.

17 Claims, 6 Drawing Sheets

(51) Int. Cl.
*F23R 3/36* (2006.01)
*F23R 3/10* (2006.01)
*F23D 14/62* (2006.01)
*F23R 3/28* (2006.01)
*F23R 3/32* (2006.01)

(56) References Cited

U.S. PATENT DOCUMENTS

| | | |
|---|---|---|
| 2009/0293482 A1 | 12/2009 | Davis, Jr. et al. |
| 2010/0139280 A1* | 6/2010 | Lacy ............... F23D 14/82 60/737 |
| 2010/0175380 A1* | 7/2010 | Davis, Jr. ......... F23R 3/283 60/734 |
| 2010/0252652 A1* | 10/2010 | Johnson ........... F23D 14/62 239/132 |
| 2013/0025285 A1* | 1/2013 | Stewart ............ F02C 7/2365 60/740 |
| 2013/0042625 A1* | 2/2013 | Barker ............. F23R 3/286 60/778 |
| 2013/0101943 A1 | 4/2013 | Uhm et al. |
| 2013/0213051 A1* | 8/2013 | Westmoreland, III ............ F23R 3/286 60/775 |
| 2013/0298561 A1 | 11/2013 | Hughes |
| 2014/0157779 A1* | 6/2014 | Uhm ................ F23R 3/286 60/725 |
| 2015/0153045 A1 | 6/2015 | York et al. |

* cited by examiner

US 10,087,844 B2

BUNDLED TUBE FUEL NOZZLE ASSEMBLY WITH LIQUID FUEL CAPABILITY

STATEMENT REGARDING FEDERALLY SPONSORED RESEARCH OR DEVELOPMENT

This invention was made with Government support under Contract No. DE-FE0023965 awarded by the United States Department of Energy. The Government has certain rights in this invention.

FIELD OF THE INVENTION

The present invention generally involves a bundled tube fuel nozzle assembly for a gas turbine combustor. More specifically, the invention relates to a bundled tube fuel nozzle assembly having liquid fuel capability.

BACKGROUND OF THE INVENTION

Gas turbines are widely used in industrial and power generation operations. A gas turbine generally includes, in serial flow order, a compressor, a combustion section and a turbine. The combustion section may include multiple combustors annularly arranged around an outer casing. In operation, a working fluid such as ambient air is progressively compressed as it flows through the compressor. A portion of the compressed working fluid is routed from the compressor to each of the combustors where it is mixed with a fuel and burned in a combustion chamber or zone to produce combustion gases. The combustion gases are routed through the turbine along a hot gas path where thermal and/or kinetic energy is extracted from the combustion gases via turbine rotors blades coupled to a rotor shaft, thus causing the rotor shaft to rotate and produce work and/or thrust.

Particular combustion systems utilize bundled tube type fuel nozzle assemblies for premixing a gaseous fuel with the compressed air upstream from the combustion zone. In certain combustor operating modes such as during diffusion flame operation, it may be desirable and/or necessary to have the capability to premix a liquid fuel with the compressed air upstream from the combustion zone via the bundled tube fuel nozzle assembly.

BRIEF DESCRIPTION OF THE INVENTION

Aspects and advantages of the invention are set forth below in the following description, or may be obvious from the description, or may be learned through practice of the invention.

One embodiment of the present invention is a bundled tube fuel nozzle assembly. The bundled tube fuel nozzle assembly includes a fuel injector and a tube bundle comprising a plurality of tubes that provide for fluid communication through a forward plate, a fuel plenum and an aft plate of the bundled tube fuel nozzle assembly. Each tube includes an inlet defined at an upstream end of the tube and an outlet defined at a downstream end of the tube. The fuel injector is disposed upstream from the inlets of each of the tubes. The upstream end of each tube is noncircular and includes at least one side portion that abuts a complementary upstream end side portion of an immediately adjacent tube of the plurality of tubes. The downstream end of each tube is circular and is spaced apart from the downstream ends of immediately adjacent tubes of the plurality of tubes.

Another embodiment of the present disclosure is a bundled tube fuel nozzle assembly. The bundled tube fuel nozzle assembly includes a forward plate that is axially spaced from an aft plate and an outer sleeve that extends between the forward and aft plates. An intermediate plate is disposed within the outer sleeve and axially spaced between the forward and aft plates. The forward plate and the intermediate plate at least partially define a fuel plenum within the bundled tube fuel nozzle assembly. A tube bundle comprises a plurality of tubes that provide for fluid communication through the forward plate, the fuel plenum and the aft plate. Each tube has an inlet that is defined at an upstream end of the tube and an outlet that is defined at a downstream end of the tube. A fuel injector is disposed upstream from the inlets of each of the tubes. The upstream end of each tube is noncircular and includes at least one side portion that abuts or is joined to a complementary upstream end side portion of an immediately adjacent tube of the plurality of tubes. The downstream end of each tube is spaced apart from the downstream ends of immediately adjacent tubes of the plurality of tubes.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
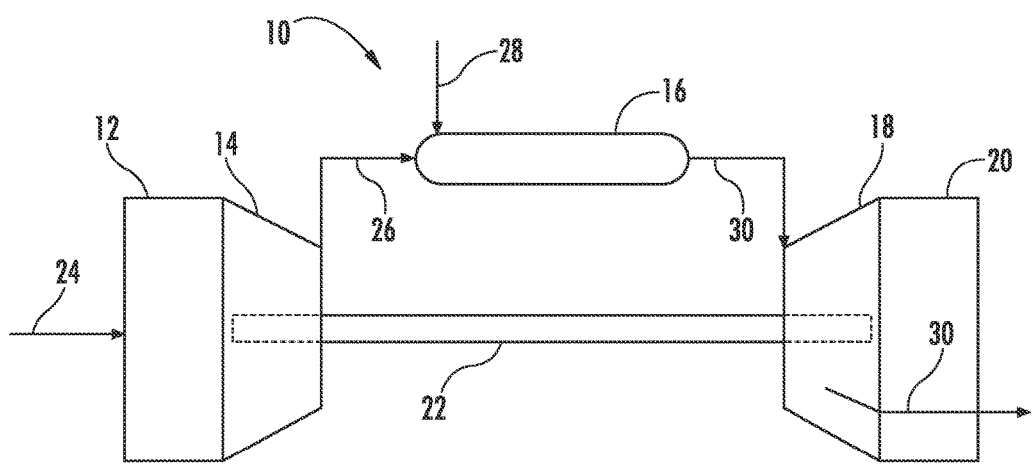
FIG. 1 is a functional block diagram of an exemplary gas turbine that may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Although exemplary embodiments of the present invention will be described generally in the context of a bundled tube bundled tube fuel nozzle assembly for a land based power generating gas turbine combustor for purposes of illustration, one of ordinary skill in the art will readily appreciate that embodiments of the present invention may be applied to any style or type of combustor for a turbomachine and are not limited to combustors or combustion systems for land based power generating gas turbines unless specifically recited in the claims.

Referring now to the drawings, FIG. 1 illustrates a schematic diagram of an exemplary gas turbine 10. The gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. The combustion gases 30 flow from the combustor 16 into the turbine 18, wherein energy (kinetic and/or thermal) is transferred from the combustion gases 30 to rotor blades (not shown), thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20.

Figure 2:
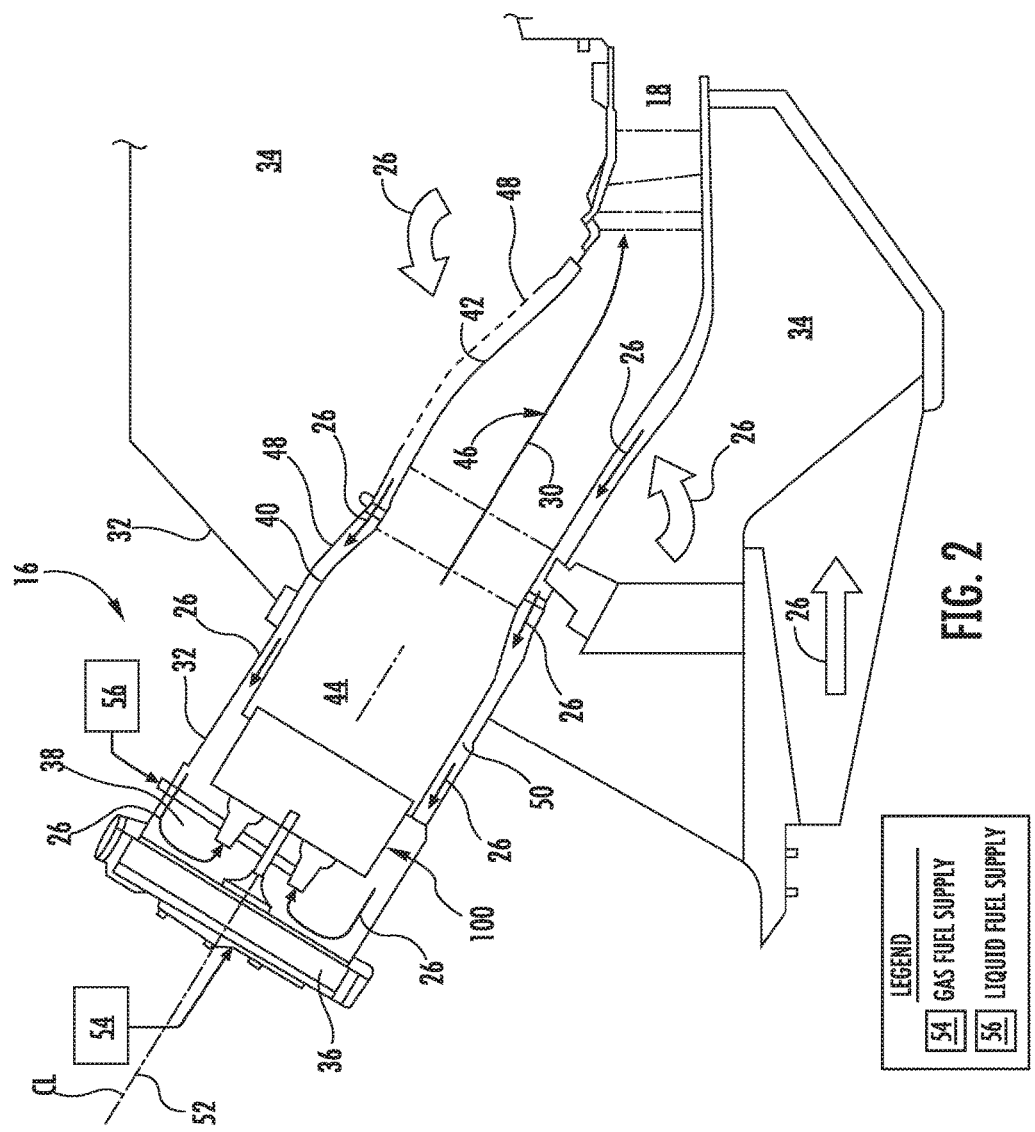
FIG. 2 is a side view of an exemplary combustor as may incorporate various embodiments of the present invention.

The combustor 16 may be any type of combustor known in the art, and the present invention is not limited to any particular combustor design unless specifically recited in the claims. For example, the combustor 16 may be a can-annular or an annular combustor. FIG. 2 provides a perspective side view of a portion of an exemplary can-annular combustor 16 as may be incorporated in the gas turbine 10 shown in FIG. 1 and as may incorporate one or more embodiments of the present invention.

As shown in FIG. 2, the combustor 16 may be at least partially surrounded an outer casing 32 such as a compressor discharge casing. The outer casing 32 may be formed from a single casing or from one or more casings coupled together. The outer casing 32 may at least partially define a high pressure plenum 34 that at least partially surrounds various components of the combustor 16. The high pressure plenum 34 may be in fluid communication with the compressor 16 (FIG. 1) so as to receive the compressed air 26 therefrom. An end cover 36 may be coupled to the outer casing 32. In particular embodiments, the outer casing 32 and the end cover 36 may at least partially define a head end volume or portion 38 of the combustor 16. In particular embodiments, the head end portion 38 is in fluid communication with the high pressure plenum 34 and/or the compressor 16.

The combustor 16 may also include one or more liners such as a combustion liner 40 and/or a transition duct 42 that at least partially define a combustion chamber or reaction zone 44 within the combustion liner 40. The combustion liner 40 and/or the transition duct 42 may also at least partially define a hot gas path 46 for directing the combustion gases 30 into the turbine 18. In particular configurations, one or more flow or impingement sleeves 48 may at least partially surround the combustion liner 40 and/or the transition duct 42. The flow sleeve(s) 48 may be radially spaced from the combustion liner 40 and/or the transition duct 42 so as to define an annular flow path 50 for directing a portion of the compressed air 26 towards the head end portion 38 of the combustor 16.

In various embodiments, the combustor 16 includes at least one bundled tube fuel nozzle assembly 100, herein referred to as "fuel nozzle assembly". As shown in FIG. 2, the fuel nozzle assembly 100 is disposed within the outer casing 32 downstream from and/or axially spaced from the end cover 36 with respect to an axial centerline 52 of the combustor 16 and upstream from the combustion chamber 44. In particular embodiments, the fuel nozzle assembly 100 is in fluid communication with a gas fuel supply 54. In addition or in the alternative, in particular embodiments the fuel nozzle assembly 100 is in fluid communication with a liquid fuel supply 56.

Figure 3:
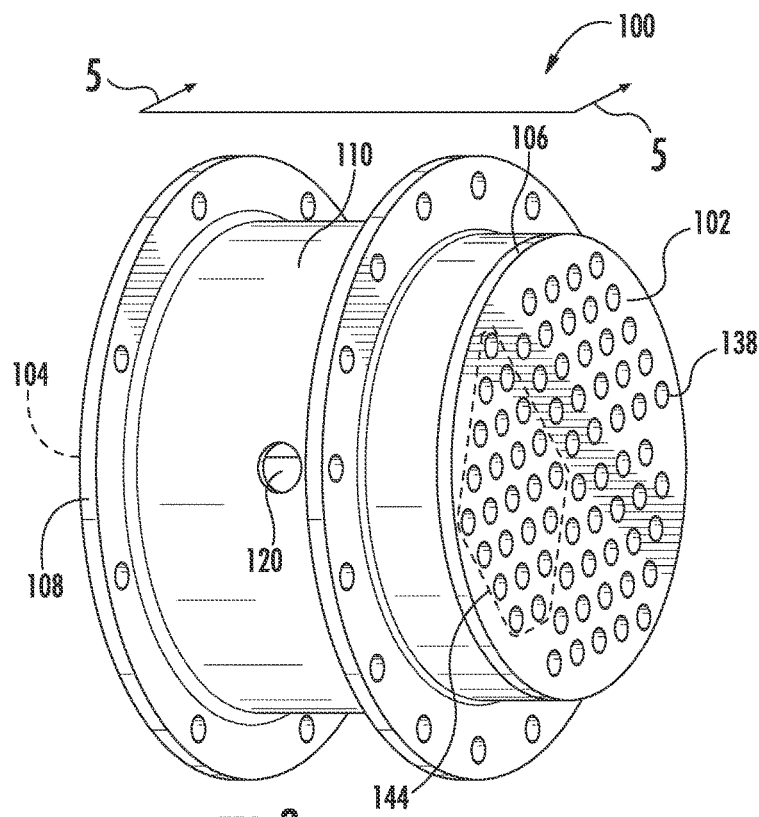
FIG. 3 is a perspective side view of a bundled tube fuel nozzle assembly according to one embodiment of the present invention.
Figure 4:
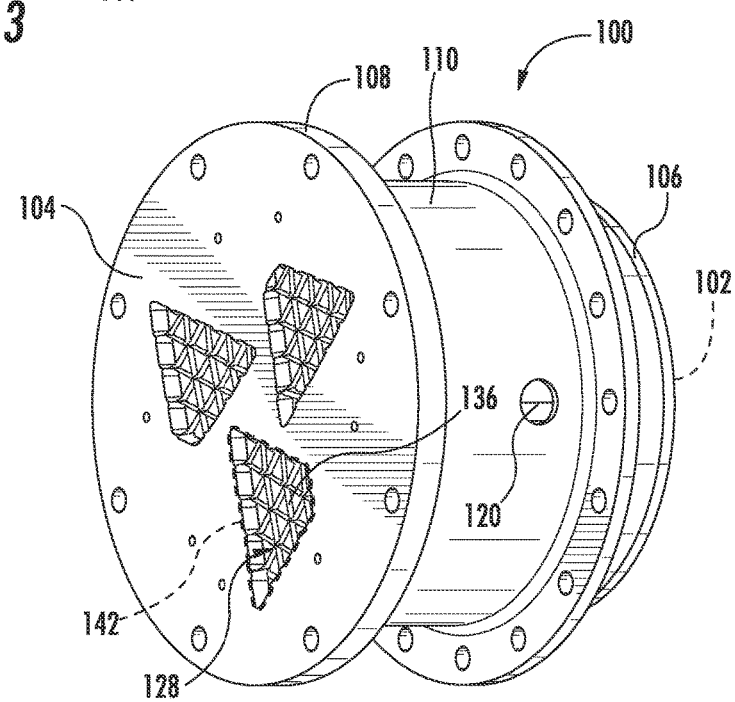
FIG. 4 is a perspective side view of the bundled tube fuel nozzle assembly as shown in FIG. 3, according to one embodiment of the present invention.
Figure 5:
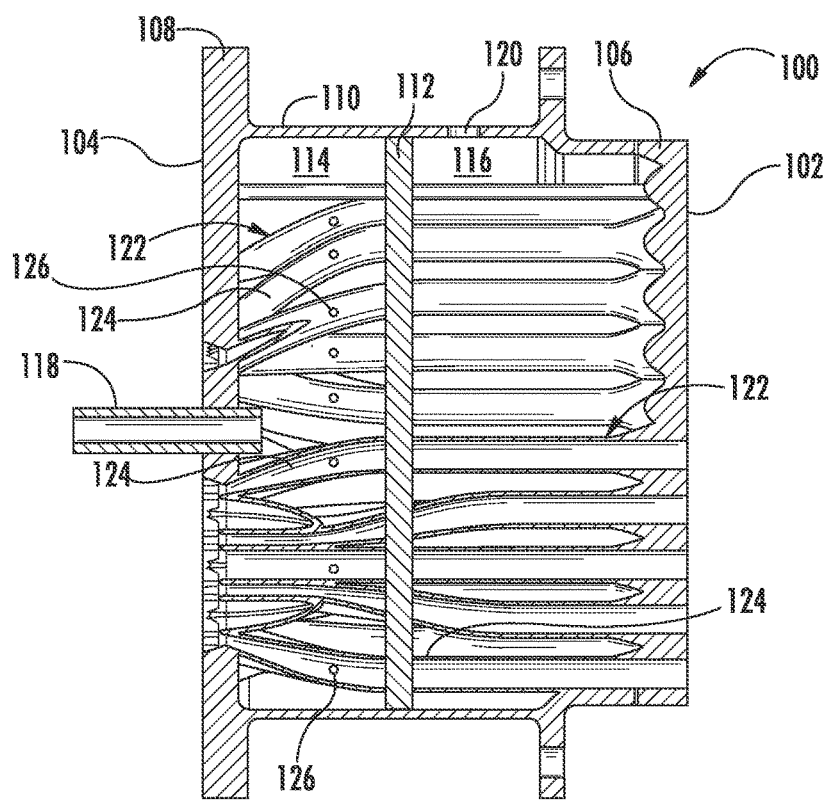
FIG. 5 is a cross sectioned side view of the bundled tube fuel nozzle assembly as taken along section line 5-5 in FIG. 3, according to one embodiment of the present invention.

FIG. 3 provides a perspective view of the fuel nozzle assembly 100 oriented so as to show a downstream or aft face portion 102 thereof according to at least one embodiment of the present invention. FIG. 4 provides a perspective view of the fuel nozzle assembly 100 oriented so as to show an upstream or forward face portion 104 of the fuel nozzle assembly 100 according to at least one embodiment of the present invention. FIG. 5 provides a cross sectional side view of the fuel nozzle assembly 100 as shown in FIGS. 3 and 4 as taken along section line 5-5 as shown in FIG. 3, according to at least one embodiment of the present invention.

As shown in FIGS. 3, 4 and 5 collectively, the aft face 102 may be at least partially defined by an aft plate or wall 106.

The forward face 104 may be at least partially defined by a forward plate or wall 108. An annular outer sleeve 110 extends axially between the forward plate 108 and the aft plate 106. In particular embodiments, as shown in FIG. 5, an intermediate plate 112 extends radially, circumferentially and axially within the outer sleeve 110 and is disposed axially between the aft plate 106 and the forward plate 108.

In particular embodiments, as shown in FIG. 5, a fuel plenum 114 is defined within the bundled tube fuel nozzle assembly 100 between the forward plate 108 and the intermediate plate 112. The fuel plenum 114 may be configured to receive either a gas or a liquid fuel. In one embodiment, the fuel plenum 114 is configured to receive a gas fuel. In one embodiment, the fuel plenum 114 is configured to receive a liquid fuel. In particular embodiments, a compressed air or diluent plenum 116 is defined within the bundled tube fuel nozzle assembly 100 between the intermediate plate 112 and the aft plate 106. The fuel plenum 114 may be in fluid communication with the gas fuel supply 54 (FIG. 2) or a liquid fuel supply via one or more fluid conduits 118. The fluid conduit 118 may extend from the end cover 36 (FIG. 2) and through the forward plate 108. The compressed air plenum 116 may be in fluid communication with the high pressure plenum 34 (FIG. 2) or an alternate compressed air or diluent supply. For example, as shown in FIGS. 3, 4 and 5, an opening or inlet 120 defined along the outer sleeve 110 may provide for fluid communication into the compressed air plenum 116.

In various embodiments, as shown in FIG. 5, the fuel nozzle assembly 100 includes at least one tube bundle 122 comprising a plurality of tubes 124 arranged at least partially within the outer sleeve 110 and extending between the forward plate 108 and the aft plate 106. The tube bundle 122 provides for fluid communication through the fuel nozzle assembly 100. In particular embodiments, the fuel nozzle assembly 100 comprises a plurality of tube bundles 122 arranged within the outer sleeve 110 and extending between the forward plate 108 and the aft plate 106. In particular embodiments, each tube 124 extends from the forward plate 108, through the fuel plenum 114, the intermediate plate 112 and terminates at and/or extends at least partially through the aft plate 106. One or more of the tubes 124 of each tube bundle 122 may include one or more fuel ports 126 disposed within and in fluid communication with the fuel plenum 114.

Figure 6:
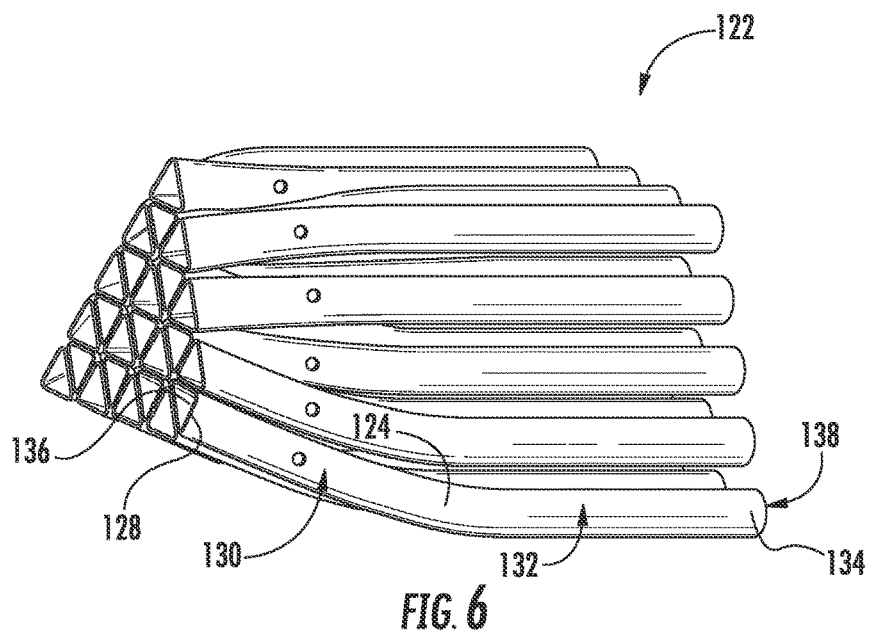
FIG. 6 is a perspective side view of an exemplary tube bundle of the bundled tube fuel nozzle assembly according to at least one embodiment of the present invention.
Figure 7:
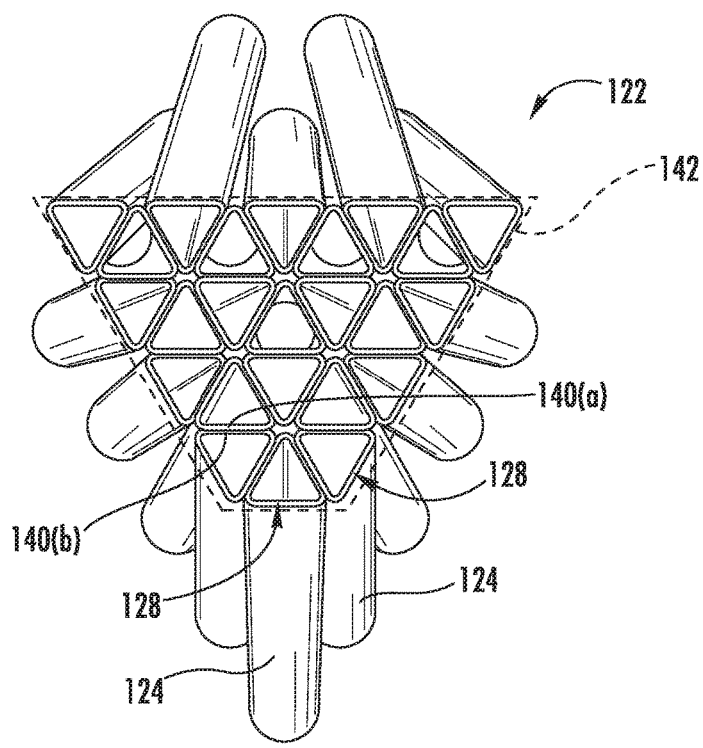
FIG. 7 is a downstream view of the tube bundle as shown in FIG. 6, according to at least one embodiment of the present invention.
Figure 8:
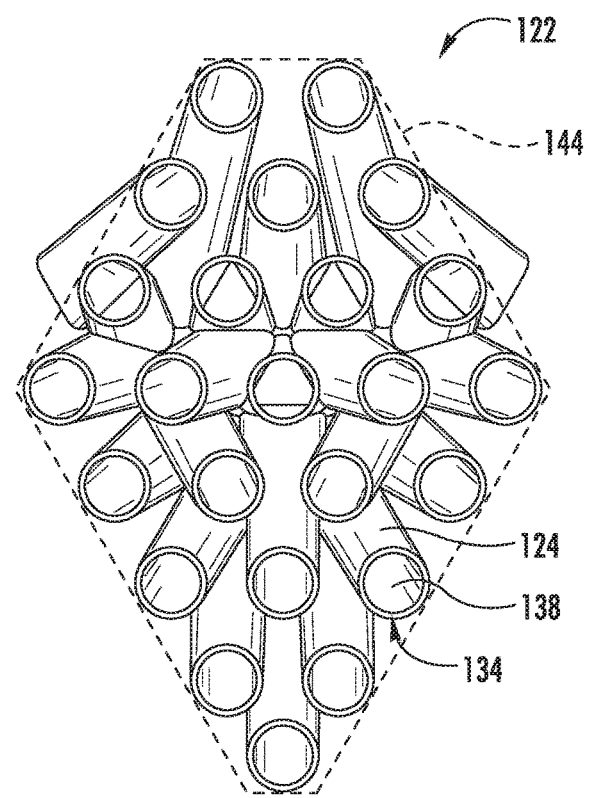
FIG. 8 is an upstream view of the tube bundle as shown in FIG. 6, according to at least one embodiment of the present invention.

FIG. 6 provides a perspective view of an exemplary tube bundle 122 according to one embodiment of the present invention. FIG. 7 provides a downstream view of the tube bundle 122 as shown in FIG. 6. FIG. 8 provides an upstream view of the tube bundle 122 as shown in FIG. 6.

As shown in FIG. 6, each tube 124 includes, in serial flow order, an upstream end 128, a transitional portion 130, a throat portion 132 and a downstream end 134. Each tube includes an inlet 136 defined at the upstream end 128 and an outlet 138 defined at the downstream end 134. As shown in FIG. 4, the upstream end 128, particularly the inlet 136 to each tube 124 may positioned adjacent to or slightly recessed axially inwardly from the forward face 104 of the forward plate 108.

In various embodiments, the upstream ends 128 of the tubes 124 are grouped together and shaped so as to fit immediately adjacent to and/or against adjacent tubes 124 of the tube bundle 122, thus minimizing and/or eliminating space or area between each inlet 136. For example, in various embodiments, as shown in FIGS. 6 and 7, the upstream end 128 of one or more of the tubes 124 of the tube bundle 122 is noncircular. In other words, the upstream end 128 of one or more of the tubes 124 may have one or more non-arcuate or flat sides. For example, in particular embodiments, the upstream end 128 of one or more of the tubes 124 may be triangular shaped. The shape of the upstream ends 128 of the tubes 124 is not limited to a triangular shape unless otherwise recited in the claims. For example, the upstream end 128 of one or more of the tubes 124 may be hexagonal, octagonal, rectangular, square or combinations thereof. In various embodiments, the transitional portion 130 of one or more of the tubes 124 corresponds with a portion of the tube 124 which transitions from the noncircular upstream end to the throat portion 132 of the tube 124 which may have a generally uniform shape such as a circular, triangular, rectangular or other shape.

In various embodiments, as shown in FIG. 7, the upstream end 128 of each tube 124 may include at least one side portion 140(a) that abuts a complementary side portion 140(b) of an upstream end 128 of an immediately adjacent tube 124. In this manner, gaps between adjacent tubes 124 are minimized or eliminated. The combined upstream ends 128 of the tubes 124 define an overall inlet area across the forward face 104 of the forward plate 108 as indicated by dashed lines 142 in both FIGS. 7 and 4. By forming and/or by connecting the upstream ends 128 of the tubes 124 in this manner, the overall inlet area 142 across the forward face 104 may be minimized. In addition, the upstream ends 128 of adjacent tubes 124 provide a smaller overall inlet area 142 when compared with circular shaped inlets (not shown), thereby minimizing or eliminating any bluff area around the inlets 136.

In various embodiments, as shown in FIGS. 3 and 8, the downstream end 134 of one or more of the tubes 124 is circular and is spaced apart from the downstream ends 134 of immediately adjacent tubes 124 of the tube bundle 122. In particular embodiments, one or more of the tubes 124 of the tube bundle 122 extends in a non-rectilinear manner between the upstream end 128 and the downstream end 134. For example, as shown in FIGS. 5 through 8, one or more of the tubes 124 may bend and/or twist between the upstream end 128 and the downstream end 134, thus providing spacing or gaps between adjacent downstream ends 134 and particularly the outlets 138 of the adjacent tubes 124 of the tube bundle 122. As a result, as shown in FIGS. 3 and 8, the outlets 138 define an overall outlet area as indicated by dashed lines 144 across the aft face 102 (FIG. 3) which is greater than the overall inlet area 142 (FIG. 4) defined across the forward face 104 of the forward plate 108. For example, in one embodiment, the smaller overall inlet area 142 may be between about twenty to about twenty five percent of the overall outlet area 144.

Figure 9:
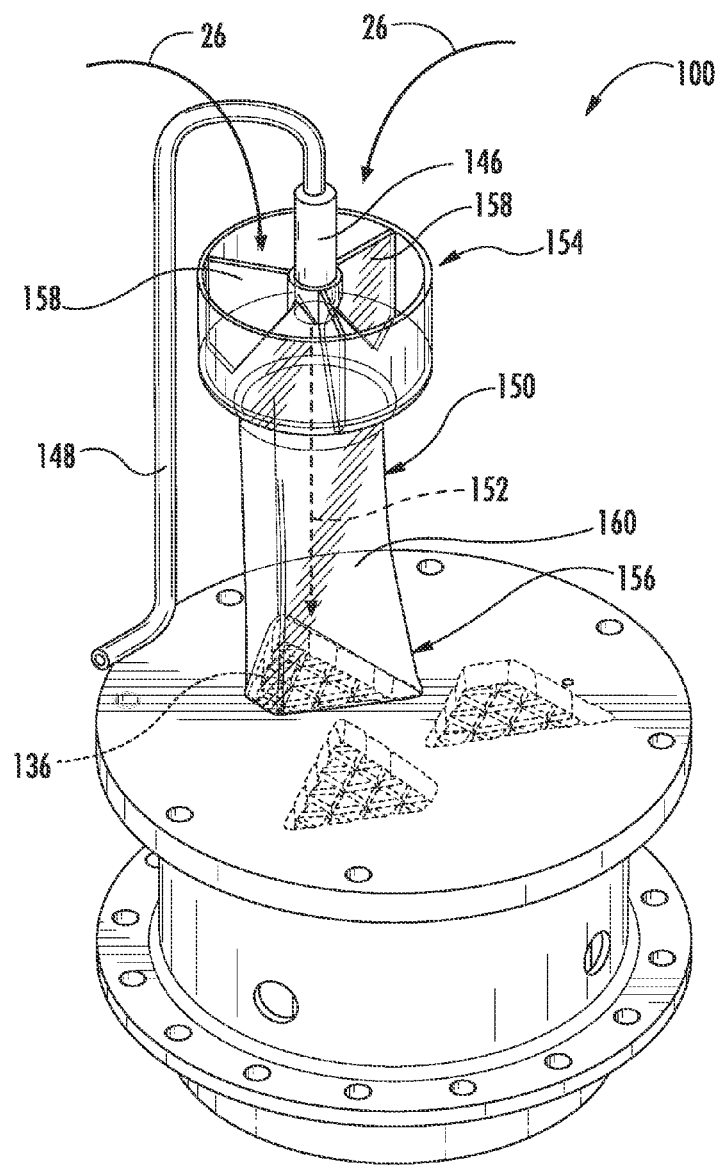
FIG. 9 is a perspective view of the bundled tube fuel nozzle assembly according to at least one embodiment of the present invention.

FIG. 9 provides a perspective view of the fuel nozzle assembly 100 according to at least one embodiment of the present invention. In particular embodiments, as shown in FIG. 9, the fuel nozzle assembly 100 includes at least one fuel injector 146 disposed upstream from the inlets 136 of the tubes 124 of the tube bundle 122. The fuel injector 146 may be in fluid communication with the liquid fuel source 56 (FIG. 2) via one or more fluid conduits 148. In addition or in the alternative, the fuel injector 146 may be in fluid communication with a gas fuel source.

In particular embodiments, the fuel nozzle assembly 100 further includes a duct or baffle 150. The duct 150 defines a flow path or passage 152 to the inlets 136 of one or more tube bundles 122. In particular embodiments, an upstream end portion 154 of the duct 150 is configured to receive a portion of the compressed air 26 from the head end 38 of the combustor 16 (FIG. 2). A downstream end portion 156 of the duct 150 may be formed or shaped to form a seal across a portion of the forward face 104 of the forward plate 104 and/or around the inlets 136 of the tube bundle 122. In one embodiment, as shown in FIG. 9, the duct 150 includes one or more vanes 158 disposed within the flow passage 152 of the duct 150. The vanes 158 may provide support for the fuel injector 146 and/or may condition the flow of the compressed air 26 as it flows through the duct 150 towards the inlets 136. In one embodiment, the fuel injector 146 may be coupled to and/or provide for fluid communication through a side wall 160 of the duct 150, thus allowing a liquid fuel to be injected generally perpendicular to the flow of the compressed air 26 flowing though the flow passage 152. In one embodiment, the fuel injector 146 may be supported and/or mounted to the end cover 36 upstream from the inlets 136.

In operation, a portion of the compressed air 26 from the compressor 14 flows from the head end 38 into the duct 150. In one embodiment, liquid fuel is injected into the flow of the compressed air 26 within the flow passage 152 upstream from the inlets 136 of the tube bundle 122. In another embodiment, gas fuel is injected into the flow of the compressed air 26 within the flow passage 152 upstream from the inlets 136 of the tube bundle 122. The duct 150 may be formed to increase the velocity of the compressed air 26 when compared with the flow velocity of the compressed air 26 within the head end 38. In addition, the minimized overall inlet area 142 results in minimization or elimination of bluff areas on the upstream face 104 of the forward plate 108. As a result, the fuel (liquid or gas) may be injected into the higher velocity flow of the compressed air 26 within the duct 150 upstream from the inlets 136, thereby increasing flow velocity through each of the tubes 124, reducing the potential for puddling of the fuel (liquid or gas) across the forward face 104 of the forward plate 108 and reducing the potential for flame holding across the forward face 104 of the forward plate 108.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A bundled tube fuel nozzle assembly, comprising:
a fuel injector; and
a tube bundle comprising a plurality of tubes that provide fluid communication through a forward plate, a fuel plenum and an aft plate of the bundled tube fuel nozzle assembly, each tube having an inlet defined at an upstream end of the tube and an outlet defined at a downstream end of the tube, wherein the fuel injector is disposed upstream from the inlets of the plurality of tubes, the forward plate is positioned at the upstream ends of the plurality of tubes, and the aft plate is positioned at the downstream ends of the plurality of tubes;
wherein the upstream ends of two or more adjacent tubes of the plurality of tubes each comprise a noncircular shape, the two or more adjacent tubes including a first tube and a second tube adjacent to the first tube, wherein a first side portion of the upstream end of the first tube abuts a second side portion of the upstream end of the second tube;
wherein the downstream end of each tube comprises a circular shape and is spaced apart from the downstream ends of adjacent tubes of the plurality of tubes; and
wherein a non-rectilinear portion of the first tube of the two or more adjacent tubes extends in a non-rectilinear manner between the upstream end of the first tube and the downstream end of the first tube such that a gap is formed between the first tube and the second tube, wherein the gap is eliminated at a location where the first side portion abuts the second side portion.

2. The bundled tube fuel nozzle assembly as in claim 1, wherein the upstream ends of the plurality of tubes define an overall inlet area across a forward face of the forward plate and the downstream ends of the plurality of tubes define an overall outlet area across an aft face of the aft plate, wherein the overall inlet area is less than the overall outlet area.

3. The bundled tube fuel nozzle assembly as in claim 1, wherein the noncircular shape is a triangular shape.

4. The bundled tube fuel nozzle assembly as in claim 1, wherein each tube of the two or more adjacent tubes of the plurality of tubes includes a transitional portion which extends from the upstream end towards the downstream end, wherein the transitional portion of each tube corresponds with a transition from the noncircular shape to the circular shape.

5. The bundled tube fuel nozzle assembly as in claim 1, wherein one or more of the tubes of the plurality of tubes comprises at least one fuel injection port disposed within and in fluid communication with the fuel plenum.

6. The bundled tube fuel nozzle assembly as in claim 1, further comprising a duct coupled to the forward plate, wherein the duct is in fluid communication with the fuel injector and defines a flow path to the inlets of the plurality of tubes.

7. The bundled tube fuel nozzle assembly as in claim 6, further comprising one or more vanes disposed within the duct upstream from the inlets of the plurality of tubes.

8. The bundled tube fuel nozzle assembly as in claim 6, wherein the fuel injector is positioned proximate to an upstream end of the duct.

9. A bundled tube fuel nozzle assembly, comprising:
a forward plate axially spaced from an aft plate and an outer sleeve that extends between the forward and aft plates; and
a tube bundle comprising a plurality of tubes that provide fluid communication through the forward plate and the aft plate, each tube having an inlet defined at an upstream end of the tube and an outlet defined at a downstream end of the tube, wherein a fuel injector is disposed upstream from the inlets of the plurality of tubes, the forward plate is positioned at the upstream ends of the plurality of tubes, and the aft plate is positioned at the downstream ends of the plurality tubes;
wherein the upstream ends of two or more adjacent tubes of the plurality of tubes each comprise a noncircular shape, the two or more adjacent tubes of the plurality of tubes comprising a first tube and a second tube, wherein the first tube and the second tube are joined directly together;
wherein the downstream end of each tube is spaced apart from the downstream ends of adjacent tubes of the plurality of tubes;

wherein a non-rectilinear portion of the first tube extends in a non-rectilinear manner between the upstream end of the first tube and the downstream end of the first tube such that a gap is formed between the first tube and the second tube, wherein the gap is eliminated at a location where the first tube and the second tube are joined directly together.

10. The bundled tube fuel nozzle assembly as in claim 9, wherein the upstream ends of the plurality of tubes define an overall inlet area across a forward face of the forward plate and the downstream ends of the plurality of tubes define an overall outlet area across an aft face of the aft plate, wherein the overall inlet area is less than the overall outlet area.

11. The bundled tube fuel nozzle assembly as in claim 9, wherein the noncircular shape is a triangular shape.

12. The bundled tube fuel nozzle assembly as in claim 9, wherein the downstream ends of the two or more adjacent tubes of the plurality of tubes each comprise a circular shape.

13. The bundled tube fuel nozzle assembly as in claim 9, wherein each tube of the two or more tubes of the plurality of tubes includes a transitional portion which extends from the upstream end towards the downstream end, wherein the transitional portion of each tube of the two or more tubes corresponds with a transition from the noncircular shape at the upstream end to a different tube shape at the downstream end.

14. The bundled tube fuel nozzle assembly as in claim 9, further comprising an intermediate plate disposed within the outer sleeve and axially spaced between the forward and aft plates, wherein the forward plate and the intermediate plate at least partially define a fuel plenum within the bundled tube fuel nozzle assembly, wherein one or more of the tubes of the plurality of tubes comprises at least one fuel injection port disposed within and in fluid communication with the fuel plenum.

15. The bundled tube fuel nozzle assembly as in claim 9, further comprising a duct coupled to the forward plate, wherein the duct is in fluid communication with the fuel injector and defines a flow path to the inlets of the plurality of tubes.

16. The bundled tube fuel nozzle assembly as in claim 15, further comprising one or more vanes disposed within the duct upstream from the inlets of the plurality of tubes.

17. The bundled tube fuel nozzle assembly as in claim 15, wherein the fuel injector is positioned proximate to an upstream end of the duct.

* * * * *